(12) United States Patent
Tiwari et al.

(10) Patent No.: US 8,943,359 B2
(45) Date of Patent: Jan. 27, 2015

(54) COMMON HOT SPARE FOR MULTIPLE RAID GROUPS

(71) Applicant: LSI Corporation, Milpitas, CA (US)

(72) Inventors: Prafull Tiwari, Bangalore (IN); Sumit Verma, Bangalore (IN); Madan Mohan Munireddy, Bangalore (IN)

(73) Assignee: LSI Corporation, Milpitas, CA (US)

( * ) Notice: Subject to any disclaimer, the term of this patent is extended or adjusted under 35 U.S.C. 154(b) by 153 days.

(21) Appl. No.: 13/646,369

(22) Filed: Oct. 5, 2012

(65) Prior Publication Data

US 2014/0101480 A1   Apr. 10, 2014

(51) Int. Cl.
*G06F 11/00* (2006.01)

(52) U.S. Cl.
USPC .............................. 714/6.3; 714/6.22; 714/6.1

(58) Field of Classification Search
CPC   G06F 11/2095; G06F 11/107; G06F 11/1092
USPC .......................................... 714/6.3, 6.33, 4.11
See application file for complete search history.

(56) References Cited

U.S. PATENT DOCUMENTS

| | | | |
|---|---|---|---|
| 7,555,601 B2 | 6/2009 | Yamagami | |
| 2002/0174293 A1* | 11/2002 | Fox et al. | 711/111 |
| 2007/0088990 A1* | 4/2007 | Schmitz | 714/700 |
| 2010/0070702 A1 | 3/2010 | Palanisamy et al. | |
| 2010/0169575 A1 | 7/2010 | Masaki et al. | |
| 2010/0251012 A1* | 9/2010 | Zwisler et al. | 714/7 |
| 2011/0138100 A1* | 6/2011 | Sinclair | 711/5 |

* cited by examiner

*Primary Examiner* — Sarai Butler
(74) *Attorney, Agent, or Firm* — Duft Bornsen & Fettig LLP

(57) ABSTRACT

A storage system assigns one or more large disks in a storage enclosure as a common dedicated hot spare that is used by multiple RAID groups. Storage space equivalent to the smallest physical disk in a RAID group is allocated on the common dedicated hot spare. A mapping of this allocated storage space to the RAID group is maintained in nonvolatile memory. When a disk fails in the RAID group, the allocated storage space on the common dedicated hot spare receives a rebuild of the failed disk. Once the rebuild is complete, the allocated storage space acts as part of the RAID group. When the failed disk is replaced, the data on the allocated storage space is copied to the replacement disk. Once the copy is complete, the allocated storage space is once again set to act as a dedicated hot spare to the RAID group.

17 Claims, 7 Drawing Sheets ured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

COMMON HOT SPARE FOR MULTIPLE RAID GROUPS

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a method of operating a redundant array of independent disks (RAID) storage system, comprising: grouping a first plurality of physical drives into a first RAID group, wherein the first plurality of physical drives comprises at least a first physical drive and a second physical drive; grouping a second plurality of physical drives into a second RAID group, wherein the second plurality of physical drives comprises at least a third physical drive and a fourth physical drive; allocating a first portion of a common dedicated hot spare physical drive to operate, in the event of a failure of the first physical drive, as a first dedicated hot spare to the first RAID group; and, allocating a second portion of the common dedicated hot spare physical drive to operate, in the event of a failure of the third physical drive, as a second dedicated hot spare to the second RAID group.

An embodiment of the invention may therefore further comprise a storage system, comprising: a first RAID group comprising a first plurality of physical drives, the first plurality of physical drives comprising at least a first physical drive and a second physical drive; a second RAID group comprising a second plurality of physical drives, the second plurality of physical drives comprising at least a third physical drive and a fourth physical drive; a common dedicated hot spare physical drive having a first portion and a second portion, the first portion of the common dedicated hot spare physical drive configured to operate, in the event of a failure of the first physical drive, as a first dedicated hot spare to the first RAID group, and the second portion of the common dedicated hot spare physical drive configured to operate, in the event of a failure of the third physical drive, as a second dedicated hot spare to the second RAID group.

DETAILED DESCRIPTION OF THE EMBODIMENTS

Figure 1:
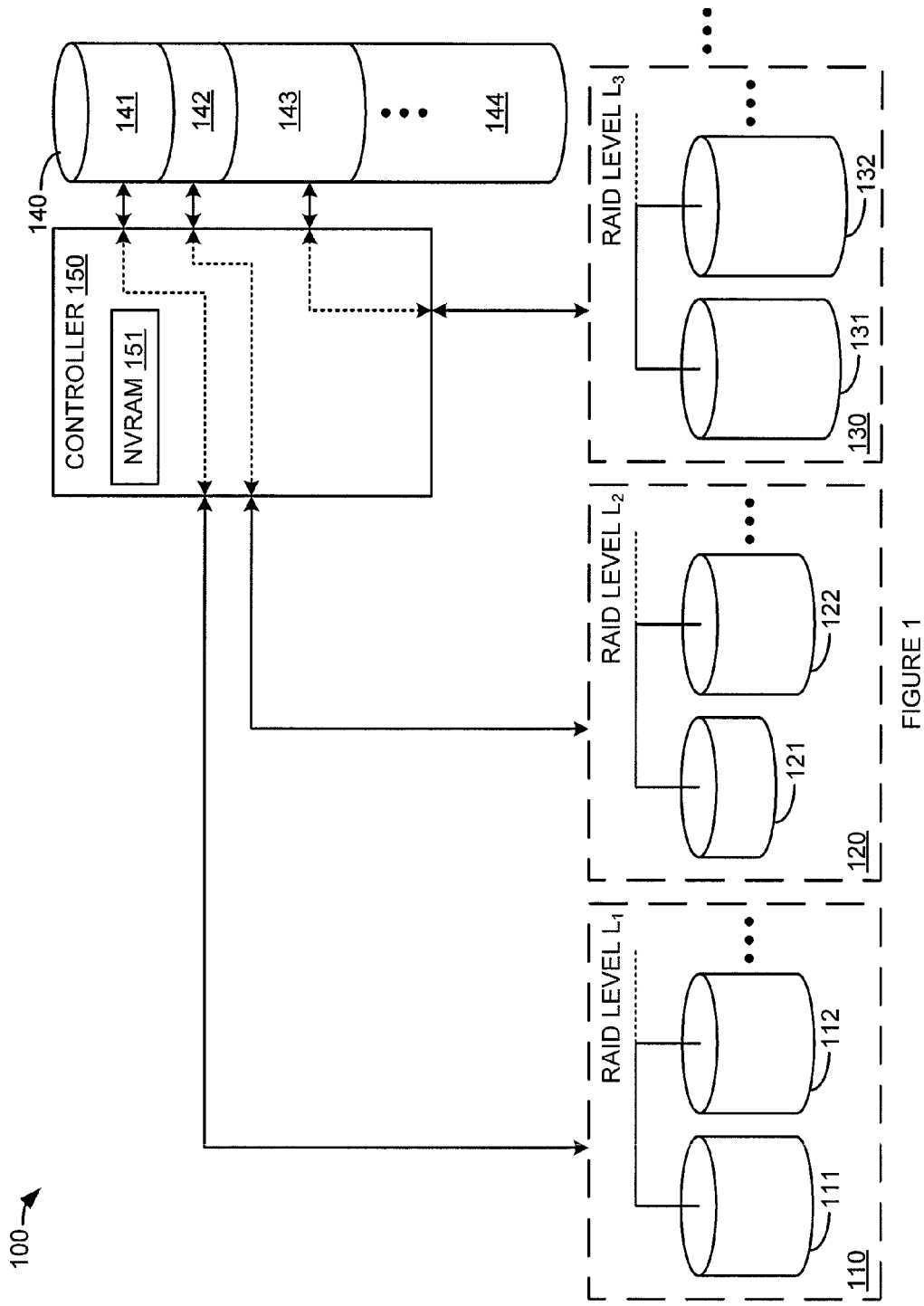
FIG. 1 is a block diagram of a storage system.

FIG. 1 is a block diagram of a storage system. In FIG. 1, storage system 100 comprises RAID group (a.k.a., disk group) 110, RAID group 120, RAID group 130, common dedicated hot spare (CDHS) 140, and controller 150. RAID group 110 includes a plurality of physical disk drives 111-112. RAID group 120 includes a plurality of physical disk drives 121-122. RAID group 130 includes a plurality of physical disk drives 131-132. CDHS 140 includes a plurality of allocated storage spaces 141-144. Controller 150 includes nonvolatile memory 151.

In FIG. 1, disk drive 111 and disk drive 112 are shown as the same size to indicate two or more disk drives within a RAID group may have the same storage capacity. Disk drive 121 is shown as being smaller than disk drive 122 to indicate two or more disk drives within a RAID group may have different storage capacities. Disk drive 131 and disk drive 132 are shown as being larger than disk drives 111-112 and 121-122 to indicate that disk drives in different RAID groups may have the same or different storage capacities as disk drives in the other RAID groups.

In an embodiment, RAID group 110 is configured as a RAID level $L_1$ disk group. In an embodiment, RAID group 120 is configured as a RAID level $L_2$ disk group. In an embodiment, RAID group 130 is configured as a RAID level $L_3$ disk group. The RAID levels $L_1$, $L_2$, and $L_3$ may each be any one of the standard or non-standard RAID levels. For example, $L_1$, $L_2$, and $L_3$ may each be selected from RAID levels 0-6 and nested RAID levels such as RAID 10 and RAID 0+1. In a specific example, $L_1$ may be RAID level 1, $L_2$ may be RAID level 5, and $L_3$ may be RAID level 10.

Controller 150 is operatively coupled to RAID group 110, RAID group 120, RAID group 130, and CDHS 140. Controller 150 operatively couples RAID group 110 to storage space 141 on CDHS 140. Controller 150 operatively couples RAID group 120 to storage space 142 on CDHS 140. Controller 150 operatively couples RAID group 130 to storage space 143 on CDHS 140. Controller 150 may also operatively couple additional RAID groups (not shown in FIG. 1) to additional storage space allocations (not shown in FIG. 1) on CDHS 140. For example, controller 150 may operatively couple additional RAID groups to storage space allocations that further divide storage space 144.

In an embodiment, CDHS 140 is assigned to be used by multiple RAID groups (e.g., RAID group 110, RAID group 120, and RAID group 130). When a RAID group is created, a size equivalent to (or larger than) the smallest sized physical disk in the RAID group is allocated on CDHS 140. For example, when RAID group 110 was created, a storage space allocation 141 that is equivalent to the smallest sized physical disk in RAID group 110 was created (allocated) and operatively coupled to RAID group 110. Likewise, when RAID group 120 was created, a storage space allocation 142 that is equivalent to the smallest sized physical disk in RAID group 120 (i.e., disk drive 121) was created (allocated) and operatively coupled to RAID group 120. When RAID group 130 was created, a storage space allocation 143 that is equivalent to the smallest sized physical disk in RAID group 130 (i.e., disk drive 131 or disk drive 132—since they are the same size) was created (allocated) and operatively coupled to RAID group 130. Storage space allocations 140-143 are to operate, in the event of a failure of a drive in their respective RAID group, as dedicated hot spares to their respective RAID group.

Once storage space allocations 141-143 have been made, controller 150 may maintain information in nonvolatile memory 151 that associates storage space allocations 141, 142, and 143 to their respective RAID groups 110, 120, and 130. In addition, controller 150 may maintain information in nonvolatile memory 151 that maps logical block address (LBA) range(s) on CDHS 140 to storage space allocations 141-143 and RAID groups 110, 120, and 130.

When a disk fails in a RAID group, a rebuild operation is performed using the storage space allocation associated with that RAID group. For example, if disk 111 fails, controller 150 can rebuild the contents of disk 111 on storage space allocation 141 using the contents of the other disk drives (e.g., disk drive 112) in the RAID group 110. When this rebuild is complete, the storage allocation associated with that RAID group is operated as part of the RAID group. For example, after a rebuild is complete, controller 150 may operate storage space allocation 141 as part of RAID group 110.

When a failed drive is replaced, the contents of the storage space allocation may be copied to the replacement drive. For example, when failed disk 111 is replaced, the contents of storage space allocation 141 (which has been operating as part of RAID group 110) are copied to the replaced drive 111. Upon completing the copy, storage space allocation 141 is no longer operated as part of RAID group 110. Thus, storage space allocation 141 is available to operate, in the event of a failure of a drive in RAID group 110, as a dedicated hot spares to RAID group 110.

Figure 2:
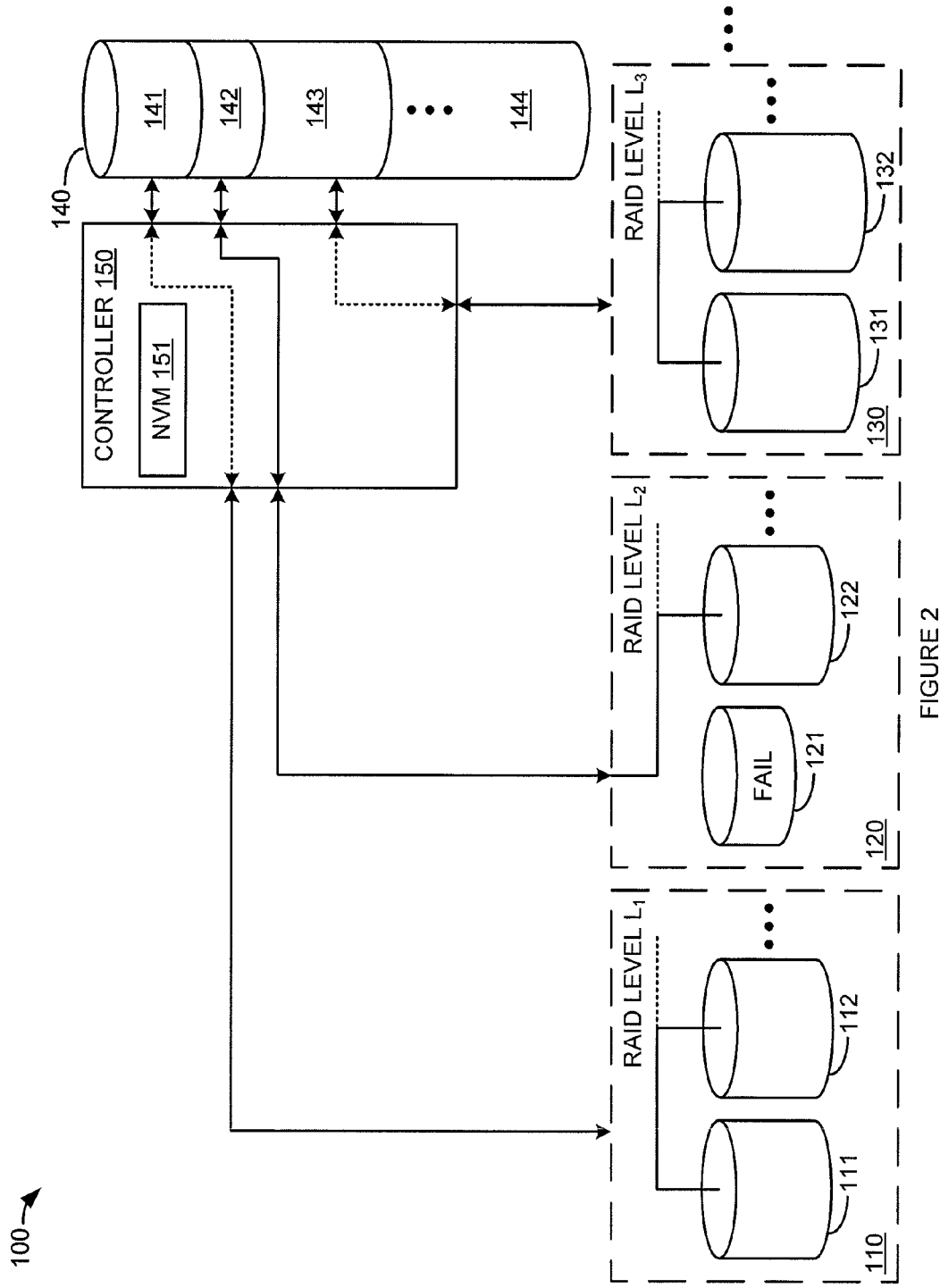
FIG. 2 is a block diagram of a storage system with a failed disk.

FIG. 2 is a block diagram of a storage system with a failed disk. In FIG. 2, storage system 100 comprises RAID group 110, RAID group 120, RAID group 130, common dedicated hot spare (CDHS) 140, and controller 150. Disk drive 121 of RAID group 120 is shown as having failed. Accordingly, in FIG. 2, failed disk drive 121 is shown disconnected from the other drives in RAID group 120 to indicate it is not being operated as part of RAID group 120. Likewise, storage space allocation 142 is shown connected to RAID group 120 and the other drives of RAID group 120 by solid lines to indicate storage space allocation 142 is being operated as part of RAID group 120.

Figure 3:
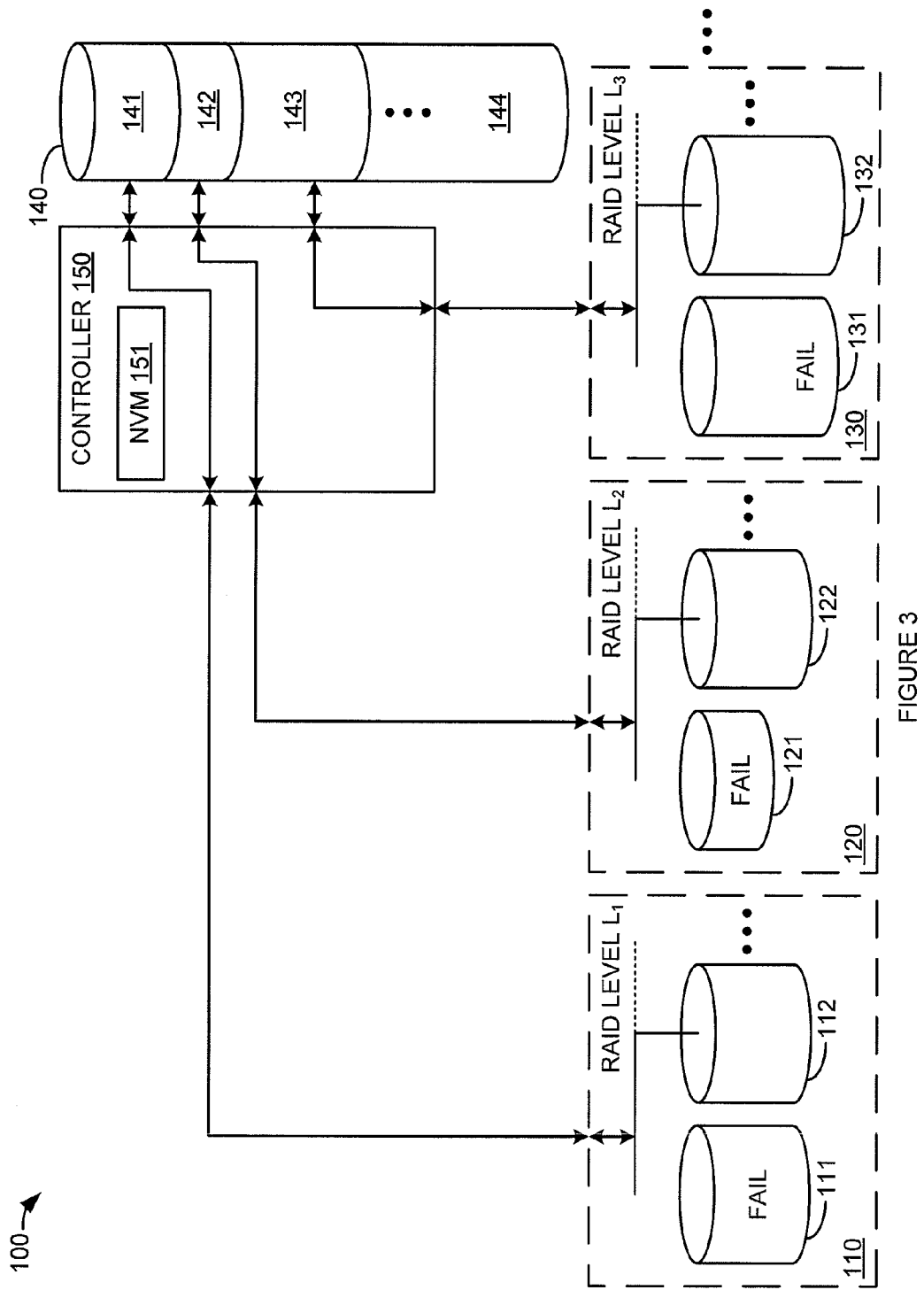
FIG. 3 is a block diagram of a storage system with multiple failed disks.

FIG. 3 is a block diagram of a storage system with multiple failed disks. In FIG. 3, storage system 100 comprises RAID group 110, RAID group 120, RAID group 130, common dedicated hot spare (CDHS) 140, and controller 150. Disk drive 111 of RAID group 110 is shown as having failed. Disk drive 121 of RAID group 120 is shown as having failed. Disk drive 131 of RAID group 130 is shown as having failed. Accordingly, in FIG. 3, failed disk drive 111 is shown disconnected from the other drives in RAID group 110 to indicate it is not being operated as part of RAID group 110. Storage space allocation 141 is shown connected to RAID group 110 and the other drives of RAID group 110 by solid lines to indicate storage space allocation 141 is being operated as part of RAID group 110. Failed disk drive 121 is shown disconnected from the other drives in RAID group 120 to indicate it is not being operated as part of RAID group 120. Storage space allocation 142 is shown connected to RAID group 120 and the other drives of RAID group 120 by solid lines to indicate storage space allocation 142 is being operated as part of RAID group 120. Failed disk drive 131 is shown disconnected from the other drives in RAID group 130 to indicate it is not being operated as part of RAID group 130. Storage space allocation 143 is shown connected to RAID group 130 and the other drives of RAID group 130 by solid lines to indicate storage space allocation 143 is being operated as part of RAID group 130.

Figure 4:
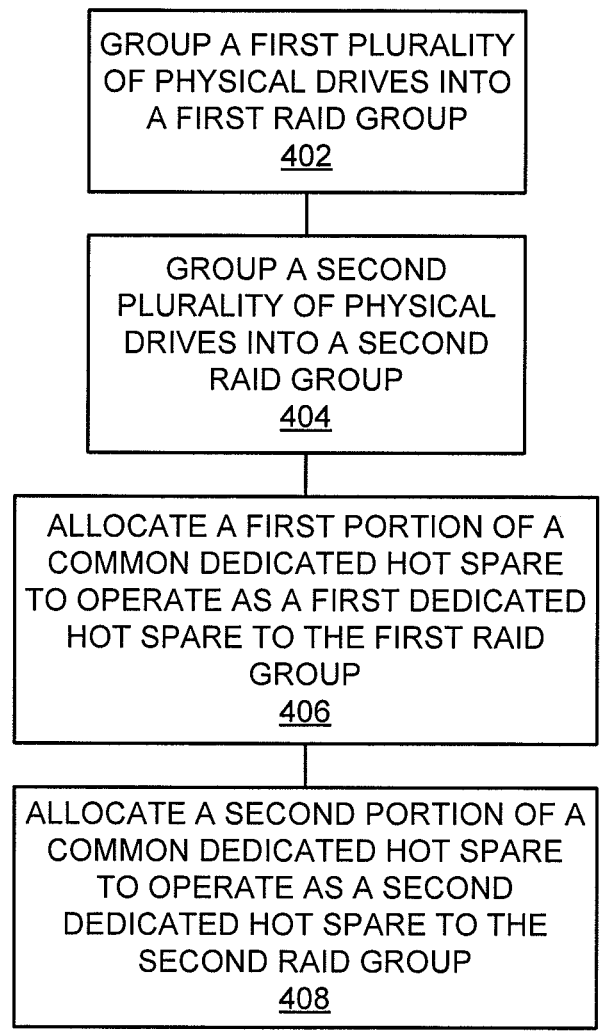
FIG. 4 is a flowchart of a method of operating a storage system.

FIG. 4 is a flowchart of a method of operating a storage system. The steps illustrated in FIG. 4 may be performed by one or more elements of storage system 100. A first plurality of physical drives are grouped into a first RAID group (402). The first plurality of physical drives may include at least a first physical drive and a second physical drive. For example, controller 150 may group disk drives 111 and 112 into RAID group 110. Information describing this grouping may be stored in nonvolatile memory 151. A second plurality of physical drives are grouped into a second RAID group (404). The second plurality of physical drives may include at least a third physical drive and a fourth physical drive. For example, controller 150 may group disk drives 121 and 122 into RAID group 120. Information describing this grouping may be stored in nonvolatile memory 151.

A first portion of a common dedicated hot spare is allocated to operate as a first dedicated hot spare to the first RAID group (406). For example, storage space allocation 141 of CDHS 140 may be allocated by controller 150 to operate as a dedicated hot spare to RAID group 110. A second portion of a common dedicated hot spare is allocated to operate as a second dedicated hot spare to the second RAID group (408). For example, storage space allocation 142 of CDHS 140 may be allocated by controller 150 to operate as a dedicated hot spare to RAID group 120.

In the event of a failure of the first physical drive, the first portion of the common dedicated hot spare may be used to rebuild the first physical drive on the first portion of the common dedicated hot spare. For example, in the event of a failure of drive 111, storage space allocation 141 of CDHS 140 may be used by controller 150 to rebuild disk drive 111 on storage space allocation 141. A replacement physical drive may be substituted for the failed physical drive. In response to the replacement physical drive being substituted for the first physical drive, the first portion of the common dedicated hot space may be copied to the replacement physical drive. For example, the failed drive 111 may be replaced by a replacement drive 111. In response to the replacement of failed drive 111, controller 150 may copy the contents of storage space allocation 141 to the replacement drive 111.

An association between the first portion of the common dedicated hot spare and the first drive group may be stored in nonvolatile memory. For example, one or more LBA ranges that define storage space allocation 141 may be stored in nonvolatile memory 151 in association with RAID group 110. These one more LBA ranges may be two or more discontinuous LBA address ranges. An association between a plurality of physical drives and a RAID group may also be stored in the nonvolatile memory. For example, an association between disk drives 111-112 and RAID group 110 may be stored in nonvolatile memory 151 by controller 150.

Figure 5:
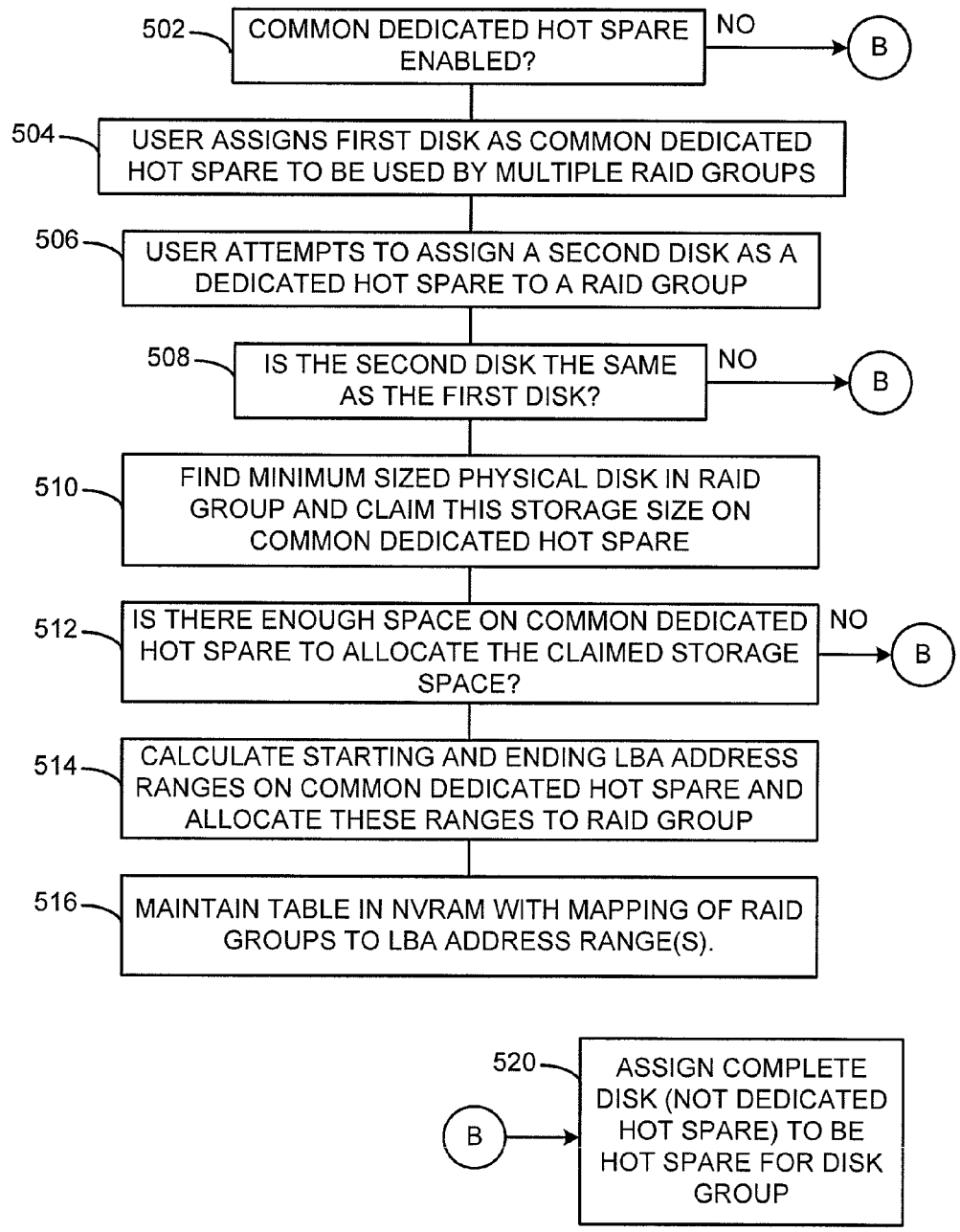
FIG. 5 is a flowchart of a method of allocating space on a common dedicated hot spare.

FIG. 5 is a flowchart of a method of allocating space on a common dedicated hot spare. The steps illustrated in FIG. 5 may be performed by one or more elements of storage system 100. If a common dedicated hot spare (or common dedicated hot spare feature) is not enabled, flow proceeds to block 520. If a common dedicated hot spare (or common dedicated hot spare feature) is enabled, flow proceeds to block 504 (502). In block 520, a complete disk (which is not the common dedicated hot spare disk) is assigned to be a hot spare for the RAID group (520).

A user assigns a first disk as a common dedicated hot spare to be used by multiple RAID groups (504). For example, a user may instruct controller 150 to assign common dedicated hot spare disk 140 as a common dedicated hot spare to be used by RAID group 110, RAID group 120, and/or RAID group 130.

A user can attempt to assign a second disk as a dedicated hot spare to a RAID group (506). If the second disk is not the same as the first disk, flow proceeds to block 520. If the second disk is the same as the first disk, flow proceeds to block 510. If there is not enough space on the common dedicated hot spare to allocate the claimed storage space, flow proceeds to block 520. If there is enough space on the common dedicated hot spare to allocate the claimed storage space, flow proceeds to block 514 (512).

The starting and ending LBA address ranges on the common dedicated hot spare are calculated and these LBA address range(s) are allocated to the RAID group (514). A table in nonvolatile memory is maintained with the mapping of RAID groups to LBA address range(s) (516). Table 1 gives an example of information that may be maintained in nonvolatile memory.

b) RAID Group #2 is a three drive RAID level 5 configuration and has PDs sizes of 50 GB, 60 GB and 50 GB. Since the smallest PD in RAID group #2 is 50 GB, RAID Group #2 is allocated a storage space allocation with a size of 50 GB. The LBAs from the CDHS are allocated to RAID Group #1 for use as a dedicated hot spare as shown in Table 2.

c) RAID group #3 is a four drive RAID level 6 configuration with PDs sized 100 GB, 150 GB, 175 GB and 150 GB. Since the smallest PD in RAID group #3 is 100 GB, RAID Group #2 is allocated a storage space allocation with a size of 100 GB. The LBAs from the CDHS are allocated to RAID Group #1 for use as a dedicated hot spare as shown in Table 2.

TABLE 2

| RAID Group # | Size of smallest physical disk in the RAID group | LBA range(s) allocated on the CDHS |
|---|---|---|
| 1 | 50 GB | 0x1001 to 0x2000 |
| 2 | 50 GB | 0x2001 to 0x3000 |
| 3 | 100 GB | 0x3001 to 0x5000 |

If, for example, RAID group #2 were to be deleted (i.e., the virtual disk associated with RAID group #2 is deleted), the storage space previously allocation previously associated with RAID group #2 is marked as unused (free). When a new RAID group is configured (e.g., RAID group #4), the LBA address ranges marked free may be combined with other LBA address ranges to create the necessary storage space allocation. For example, when RAID Group #4 is created with a two drive RAID level 1 configuration and each PD is 300 GB size,

TABLE 1

| | RAID group information | | | Common dedicated hot spare information | | | | |
|---|---|---|---|---|---|---|---|---|
| Virtual disk ID # | Physical disk ID #'s of RAID group members | RAID group status | Physical disk ID # of CDHS | Starting LBA for storage space allocation | Ending LBA for storage space allocation | Is storage space allocation on CDHS being used? | State of storage space allocation on CDHS | Comments |
| 2 | 55, 56, 58 | OK | 63 | 0x10000 | 0x19000 | No | n/a | As RAID group is in OK state, storage space allocation will not be used |
| 5 | 70, 71, 72, 74 | Degraded | 63 | 0x20000 | 0x30000 | Yes | Rebuild in progress using storage space allocation | As RAID group is in a degraded state, the storage space allocation is being used to rebuild a physical disk |
| 6 | 90, 91 | OK | 63 | 0x40000 | 0x70000 | Yes | Rebuild is complete and storage space allocation being used in place of failed disk | As RAID group is in OK state, storage space allocation will be used by RAID group until failed drive is replaced and data is copied from storage space allocation |

It should be understood that the allocation LBA ranges may not be static. For example, consider three RAID groups configured as follows:

a) RAID Group #1 is a two drive RAID level 1 configuration and each physical disk (PD) has 50 GB size. RAID Group #1 is allocated a storage space allocation with a size of 50 GB. The LBAs from the CDHS are allocated to RAID Group #1 for use as a dedicated hot spare as shown in Table 2.

the LBAs from the CDHS may be allocated to RAID Group #4 for use as a dedicated hot spare as shown in Table 3.

TABLE 3

| RAID Group # | Size of smallest physical disk in the RAID group | LBA range(s) allocated on the CDHS |
|---|---|---|
| 1 | 50 GB | 0x1001 to 0x2000 |
| 3 | 100 GB | 0x3001 to 0x5000 |

TABLE 3-continued

| RAID Group # | Size of smallest physical disk in the RAID group | LBA range(s) allocated on the CDHS |
|---|---|---|
| 4 | 300 GB | 0x2001 to 0x3000 and 0x5001 to 0x10000 |

Figure 6:
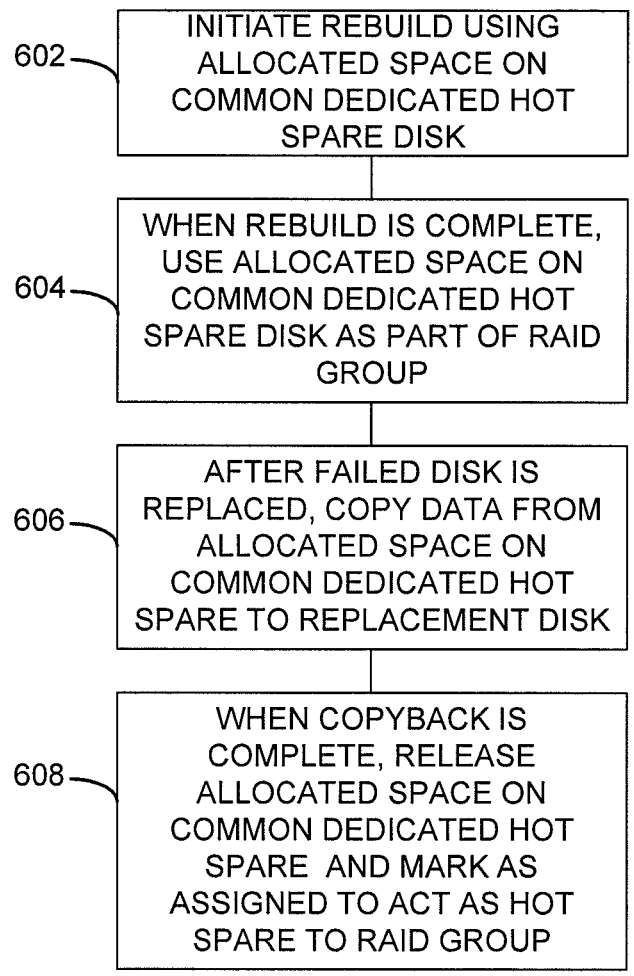
FIG. 6 is a flowchart of a method of operating a storage system with a common dedicated hot spare.

FIG. 6 is a flowchart of a method of operating a storage system with a common dedicated hot spare. The steps illustrated in FIG. 6 may be performed by one or more elements of storage system 100. A rebuild is initiated using space allocated on a common dedicated hot spare disk (602). For example, controller 150 may initiate a rebuild of a failed disk 121 using space allocated on common dedicated hot spare 140 (e.g., storage space allocation 142). When the rebuild is complete, the allocated space on the common dedicated hot spare is used as part of the RAID group (604). For example, controller 150 may use storage space allocation 142, which now contains the rebuilt contents of failed disk 121, as part of RAID group 120.

After the failed disk is replace, data is copied from the allocated space on the common dedicated hot spare to a replacement disk (606). For example, after failed disk 121 is replaced, controller 150 may copy the contents of storage space allocation 142 to replacement disk 121. When this copyback is complete, the allocated space on the common dedicated hot spare is release and marked as assigned to act as a hot spare to the RAID group (608). For example, after the contents of storage space allocation 142 are copied to replacement disk 121, controller 150 may release storage space allocation 142 from being used as part of RAID group 120 and mark storage space allocation 142 as assigned to act as a hot spare to RAID group 120.

The methods, systems, networks, devices, equipment, and functions described above may be implemented with or executed by one or more computer systems. The methods described above may also be stored on a computer readable medium. Many of the elements of communication system 100, may be, comprise, or include computers systems. This includes, but is not limited to, controller 150.

Figure 7:
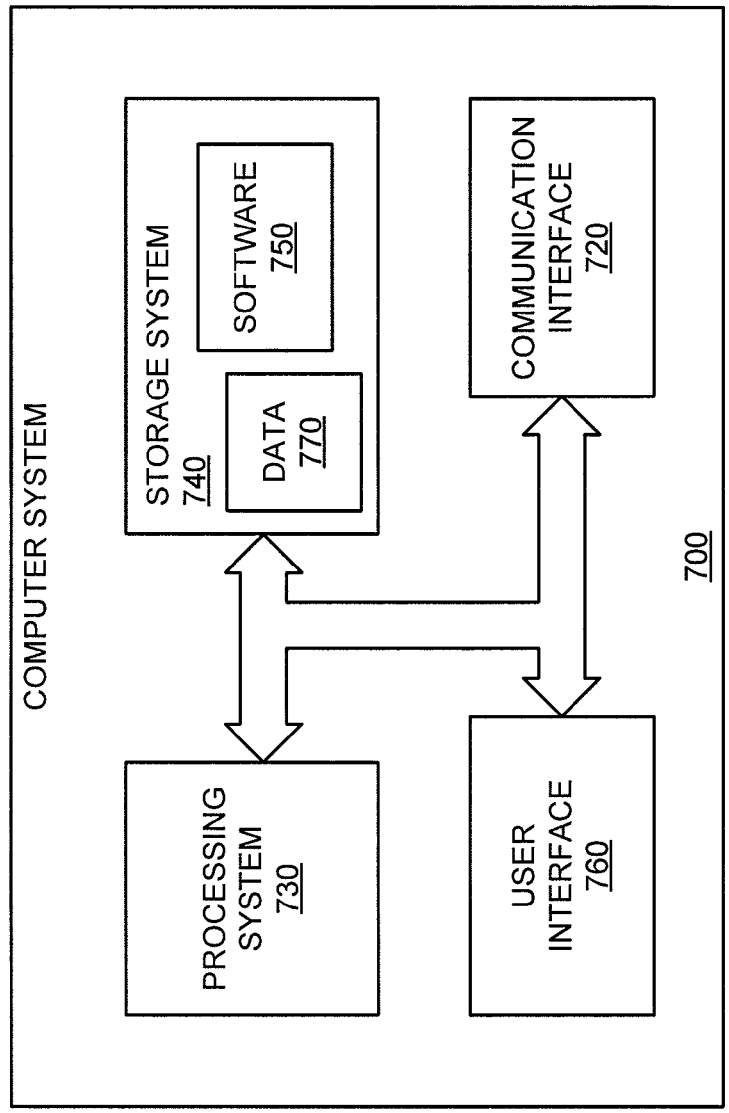
FIG. 7 is a block diagram of a computer system.

FIG. 7 illustrates a block diagram of a computer system. Computer system 700 includes communication interface 720, processing system 730, storage system 740, and user interface 760. Processing system 730 is operatively coupled to storage system 740. Storage system 740 stores software 750 and data 770. Processing system 730 is operatively coupled to communication interface 720 and user interface 760. Computer system 700 may comprise a programmed general-purpose computer. Computer system 700 may include a microprocessor. Computer system 700 may comprise programmable or special purpose circuitry. Computer system 700 may be distributed among multiple devices, processors, storage, and/or interfaces that together comprise elements 720-770.

Communication interface 720 may comprise a network interface, modem, port, bus, link, transceiver, or other communication device. Communication interface 720 may be distributed among multiple communication devices. Processing system 730 may comprise a microprocessor, microcontroller, logic circuit, or other processing device. Processing system 730 may be distributed among multiple processing devices. User interface 760 may comprise a keyboard, mouse, voice recognition interface, microphone and speakers, graphical display, touch screen, or other type of user interface device. User interface 760 may be distributed among multiple interface devices. Storage system 740 may comprise a disk, tape, integrated circuit, RAM, ROM, network storage, server, or other memory function. Storage system 740 may be a computer readable medium. Storage system 740 may be distributed among multiple memory devices.

Processing system 730 retrieves and executes software 750 from storage system 740. Processing system 730 may retrieve and store data 770. Processing system 730 may also retrieve and store data via communication interface 720. Processing system 730 may create or modify software 750 or data 770 to achieve a tangible result. Processing system 730 may control communication interface 720 or user interface 760 to achieve a tangible result. Processing system 730 may retrieve and execute remotely stored software via communication interface 720.

Software 750 and remotely stored software may comprise an operating system, utilities, drivers, networking software, and other software typically executed by a computer system. Software 750 may comprise an application program, applet, firmware, or other form of machine-readable processing instructions typically executed by a computer system. When executed by processing system 730, software 750 or remotely stored software may direct computer system 700 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of operating a redundant array of independent disks (RAID) storage system, comprising:
    grouping a first plurality of physical drives into a first RAID group in a first RAID level, wherein the first plurality of physical drives comprises at least a first physical drive and a second physical drive;
    grouping a second plurality of physical drives into a second RAID group in a second RAID level that is different than the first RAID level, wherein the second plurality of physical drives comprises at least a third physical drive and a fourth physical drive;
    allocating a first portion of storage space of a single common dedicated hot spare physical drive to operate, in the event of a failure of the first physical drive, as a first dedicated hot spare to the first RAID group, the common dedicated hot spare physical drive not used as part of said first RAID group and not used as part of said second RAID group;
    allocating a second portion of storage space of the common dedicated hot spare physical drive to operate, in the event of a failure of the third physical drive, as a second dedicated hot spare to the second RAID group;
    rebuilding the first physical drive of the first RAID group in the first portion of the storage space of the common dedicated hot spare physical drive; and
    rebuilding the third physical drive of the second RAID group in the second portion of the storage space of the common dedicated hot spare physical drive.

2. The method of claim 1, further comprising:
in response to a replacement first physical drive being substituted for said first physical drive, copying the first portion of storage space of the common dedicated hot spare physical drive to the replacement first physical drive.

3. The method of claim 1, further comprising:
storing, in nonvolatile memory, an association between said first portion of storage space of said common dedicated hot spare physical drive and said first drive group.

4. The method of claim 1, further comprising:
storing, in nonvolatile memory, an association between a plurality of logical block addresses on said common dedicated hot spare physical drive and said first drive group.

5. The method of claim 4, further comprising:
storing, in said nonvolatile memory, an association between said first plurality of physical drives and said first RAID group.

6. The method of claim 4, wherein said plurality of logical block addresses comprise at least two discontinuous logical block address ranges.

7. A storage system, comprising:
a first RAID group comprising a first plurality of physical drives configured in a first RAID level, the first plurality of physical drives comprising at least a first physical drive and a second physical drive;
a second RAID group comprising a second plurality of physical drives configured in a second RAID level that is different than the first RAID level, the second plurality of physical drives comprising at least a third physical drive and a fourth physical drive; and,
a single common dedicated hot spare physical drive having a first portion of storage space and a second portion of storage space, the first portion of storage space of the common dedicated hot spare physical drive configured to operate, in the event of a failure of the first physical drive, as a first dedicated hot spare to the first RAID group, and the second portion of storage space of the common dedicated hot spare physical drive configured to operate, in the event of a failure of the third physical drive, as a second dedicated hot spare to the second RAID group, the common dedicated hot spare physical drive not used as part of said first RAID group and not used as part of said second RAID group,
wherein the first RAID group is operable to rebuild the first physical drive of the first RAID group in the first portion of the storage space of the common dedicated hot spare physical drive, and
wherein the second RAID group is operable to rebuild the third physical drive of the second RAID group in the second portion of the storage space of the common dedicated hot spare physical drive.

8. The storage system of claim 7, wherein in response to a replacement first physical drive being substituted for said first physical drive, the first portion of storage space of the common dedicated hot spare physical drive is to be copied to the replacement first physical drive.

9. The storage system of claim 7, further comprising:
a nonvolatile memory that is to store an association between said first portion of storage space of said common dedicated hot spare physical drive and said first drive group.

10. The storage system of claim 7, further comprising:
a nonvolatile memory that is to store an association between a plurality of logical block addresses on said common dedicated hot spare physical drive and said first drive group.

11. The storage system of claim 7, wherein the nonvolatile memory is to store an association between said first plurality of physical drives and said first RAID group.

12. The storage system of claim 7, wherein said plurality of logical block addresses comprise at least two discontinuous logical block address ranges.

13. A non-transitory computer readable medium having instructions stored thereon for operating a redundant array of independent disks (RAID) storage system that, when executed by a computer, at least instruct the computer to:
group a first plurality of physical drives into a first RAID group in a first RAID level, wherein the first plurality of physical drives comprises at least a first physical drive and a second physical drive;
group a second plurality of physical drives into a second RAID group in a second RAID level that is different than the first RAID level, wherein the second plurality of physical drives comprises at least a third physical drive and a fourth physical drive;
allocate a first portion of storage space of a single common dedicated hot spare physical drive to operate, in the event of a failure of the first physical drive, as a first dedicated hot spare to the first RAID group, the common dedicated hot spare physical drive not used as part of said first RAID group and not used as part of said second RAID group; and,
allocate a second portion of storage space of the common dedicated hot spare physical drive to operate, in the event of a failure of the third physical drive, as a second dedicated hot spare to the second RAID group;
rebuild the first physical drive of the first RAID group in the first portion of the storage space of the common dedicated hot spare physical drive; and
rebuild the third physical drive of the second RAID group in the second portion of the storage space of the common dedicated hot spare physical drive.

14. The medium of claim 13, wherein the computer is further instructed to:
in response to a replacement first physical drive being substituted for said first physical drive, copy the first portion of storage space of the common dedicated hot spare physical drive to the replacement first physical drive.

15. The medium of claim 13, wherein the computer is further instructed to:
store, in nonvolatile memory, an association between said first portion of storage space of said common dedicated hot spare physical drive and said first drive group.

16. The medium of claim 13, wherein the computer is further instructed to:
store, in nonvolatile memory, an association between a plurality of logical block addresses on said common dedicated hot spare physical drive and said first drive group.

17. The medium of claim 16, wherein the computer is further instructed to:
store, in said nonvolatile memory, an association between said first plurality of physical drives and said first RAID group.

* * * * *